US011440362B2

(12) United States Patent
Nicholson (10) Patent No.: US 11,440,362 B2
(45) Date of Patent: Sep. 13, 2022

(54) UNIVERSAL MOUNTING CLAMPS SYSTEM AND METHOD

(71) Applicant: John Wesley Nicholson, Marrero, LA (US)

(72) Inventor: John Wesley Nicholson, Marrero, LA (US)

(*) Notice: Subject to any disclaimer, the term of this patent is extended or adjusted under 35 U.S.C. 154(b) by 0 days.

(21) Appl. No.: 17/367,534

(22) Filed: Jul. 5, 2021

(65) Prior Publication Data
US 2021/0331536 A1     Oct. 28, 2021

Related U.S. Application Data

(63) Continuation-in-part of application No. 16/683,163, filed on Nov. 13, 2019, now Pat. No. 11,053,964.
(Continued)

(51) Int. Cl.
*B60D 1/58* (2006.01)
*B62D 65/16* (2006.01)
(Continued)

(52) U.S. Cl.
CPC .......... *B60D 1/58* (2013.01); *B60D 1/02* (2013.01); *B60D 1/52* (2013.01); *B62D 65/16* (2013.01); *F16B 2/065* (2013.01); *B60D 1/48* (2013.01); *B60R 2011/004* (2013.01); *B60R 2011/008* (2013.01); *B60R 2011/0059* (2013.01); *F16B 2/08* (2013.01); *F16L 3/1091* (2013.01)

(58) Field of Classification Search
CPC ... B60D 1/02; B60D 1/48; B60D 1/52; B60D 1/58; B62D 65/16; F16B 2/065; F16B 2/08; F16L 3/006; F16L 3/10–1025; F16L 3/1091; B60R 2011/004; B60R 2011/0059; B60R 2011/008
See application file for complete search history.

(56) References Cited

U.S. PATENT DOCUMENTS 4,730,841 A   3/1988   Ponder
4,993,670 A *   2/1991   Tesar .................. F16L 3/2235
                                                        248/74.1
(Continued)

FOREIGN PATENT DOCUMENTS

DE         20018591 U1    1/2001
KR    20090006615 U *   7/2009 ............ F16L 3/1008

*Primary Examiner* — Matthew P Travers
(74) *Attorney, Agent, or Firm* — Keaty Law Firm LLC (57) ABSTRACT

A universal mounting clamps system and method for mounting a variety of accessories upon structures having various square, rectangular, or rounded profiles and various ratios and sizes, such as vehicle trailer hitches or bumpers, beams, posts, tubes, and pipes. In an angled-profile-structure embodiment using an angled mounting-clamp unit, an accessory-mount bracket is placed over a corner of the structure and provides area for mounting accessories. A clamping bracket is placed over the diagonally opposite corner of the structure and is fastened to the accessory-mount bracket using a fastener positioner. In a rounded-profile-structure embodiment, a curved mounting-clamp unit is fastened to the structure through a fastener slot, a positioner leg is held in position against the structure, and an accessory-mount leg is held extended from the structure and provides an area for mounting accessories.

20 Claims, 10 Drawing Sheets

Related U.S. Application Data

(60) Provisional application No. 62/768,046, filed on Nov. 15, 2018.

(51) Int. Cl.
| | |
|---|---|
| *F16B 2/06* | (2006.01) |
| *F16B 2/08* | (2006.01) |
| *B60R 11/00* | (2006.01) |
| *F16L 3/10* | (2006.01) |
| *B60D 1/02* | (2006.01) |
| *B60D 1/52* | (2006.01) |
| *B60D 1/48* | (2006.01) |

(56) References Cited

U.S. PATENT DOCUMENTS

| | | |
|---|---|---|
| 5,288,094 A | 2/1994 | Putnam |
| 5,584,495 A | 12/1996 | Mason |
| 6,976,695 B1 | 12/2005 | Smith, III |
| 8,186,702 B2 * | 5/2012 | McCoy .................. B60D 1/58 280/406.1 |
| 2005/0225054 A1 | 10/2005 | Budge |
| 2009/0115165 A1 | 5/2009 | Coy |
| 2011/0031364 A1 | 2/2011 | Kneshtel, Jr. et al. |
| 2018/0117979 A1 | 5/2018 | Columbia |
| 2018/0135795 A1 | 5/2018 | Palmer et al. |
| 2019/0225037 A1 | 7/2019 | Kang |
| 2020/0016946 A1 | 1/2020 | Fabiano |

\* cited by examiner

UNIVERSAL MOUNTING CLAMPS SYSTEM AND METHOD

CROSS-REFERENCE TO RELATED APPLICATIONS

This application is a continuation-in-part of pending application Serial No. U.S. Ser. No. 16/683,163, filed on Nov. 13, 2019 and titled "Tow-Bar Mounting System and Method," which claimed the benefit of provisional application U.S. Ser. No. 62/768,046, filed on Nov. 15, 2018 and titled "Mounting Mechanism for Lights or Accessories to Trailer Hitch or Bumper," the full disclosures of which are incorporated by reference herein and priority of which is hereby claimed.

BACKGROUND OF THE INVENTION

This invention provides a universal mounting clamps system and method for mounting a variety of accessories upon structures having various square, rectangular, or rounded profiles and various ratios and sizes, such as vehicle trailer hitches or bumpers, beams, posts, tubes, and pipes.

Currently there are there are a number of solutions to clamp to square, rectangular, or round structures, but these solutions fail to meet the needs of the industry because they are designed to fit on specific structures with specific dimensions and are not able to be used on other structures with different dimensions. Other solutions attempt to mount something to a square or rectangular structure, but these solutions are similarly unable to meet the needs of the industry because they are, again, used for at least one specified dimension. Still other solutions seek to attach something to a square or rectangular structure, but these solutions also fail to meet industry needs because they may require drilling, machining, substantially manipulating, substantially defacing, or otherwise altering the structure. Currently there are also a number of solutions for mounting things using a hose clamp. Some of these solutions attempt to mount fire extinguishers, but these solutions fail to meet the needs of the industry because they are made specifically to mount fire extinguishers. Other solutions attempt to mount hoses to something, but these solutions are similarly unable to meet the needs of the industry because the clamps are not used in such a way to mount something to a structure that may not be a hose. Still other solutions seek to use hose clamps to mount other things, but these solutions also fail to meet industry needs because they are very limited to very specific things and do not provide enough surface area or mechanisms to allow for a variety of ways to mount a variety of things.

Current clamps and methods of clamping to structures having various square, rectangular, or round profiles do not provide sufficient additional area and means for the removable and adjustable attaching of a variety of accessories to the structures.

SUMMARY OF THE INVENTION

This invention provides a universal mounting clamps system and method for mounting a variety of accessories upon structures having various square, rectangular, or rounded profiles and various ratios and sizes, such as vehicle trailer hitches or bumpers, beams, posts, tubes, and pipes. In an angled-profile-structure embodiment using an angled mounting-clamp unit, an accessory-mount bracket is placed over a corner of the structure and provides area for mounting accessories. A clamping bracket is placed over the diagonally opposite corner of the structure and is fastened to the accessory-mount bracket using a fastener positioner. In a rounded-profile-structure embodiment, a curved mounting-clamp unit is fastened to the structure through a fastener slot, a positioner leg is held in position against the structure, and an accessory-mount leg is held extended from the structure and provides an area for mounting accessories.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
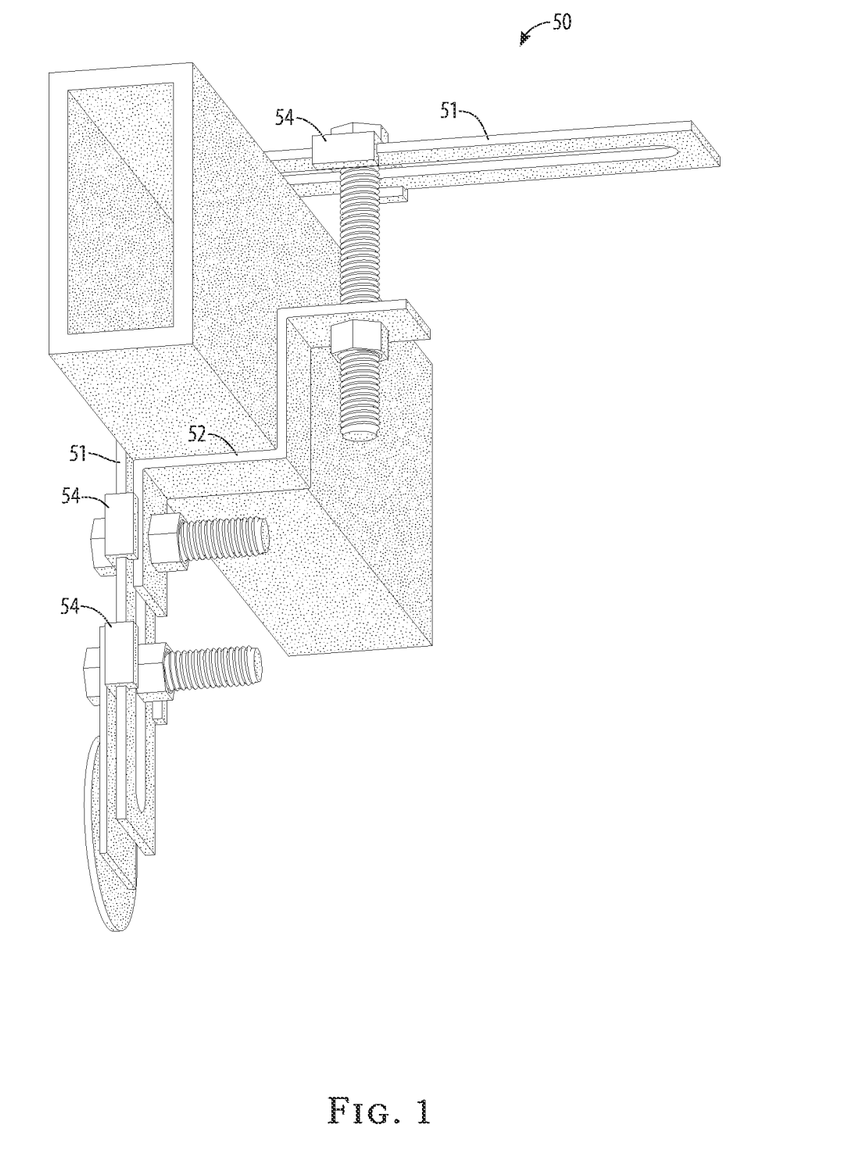
FIG. 1 is a perspective view of an embodiment of the universal mounting clamps system and method of the invention in use mounting an accessory.
Figure 2:
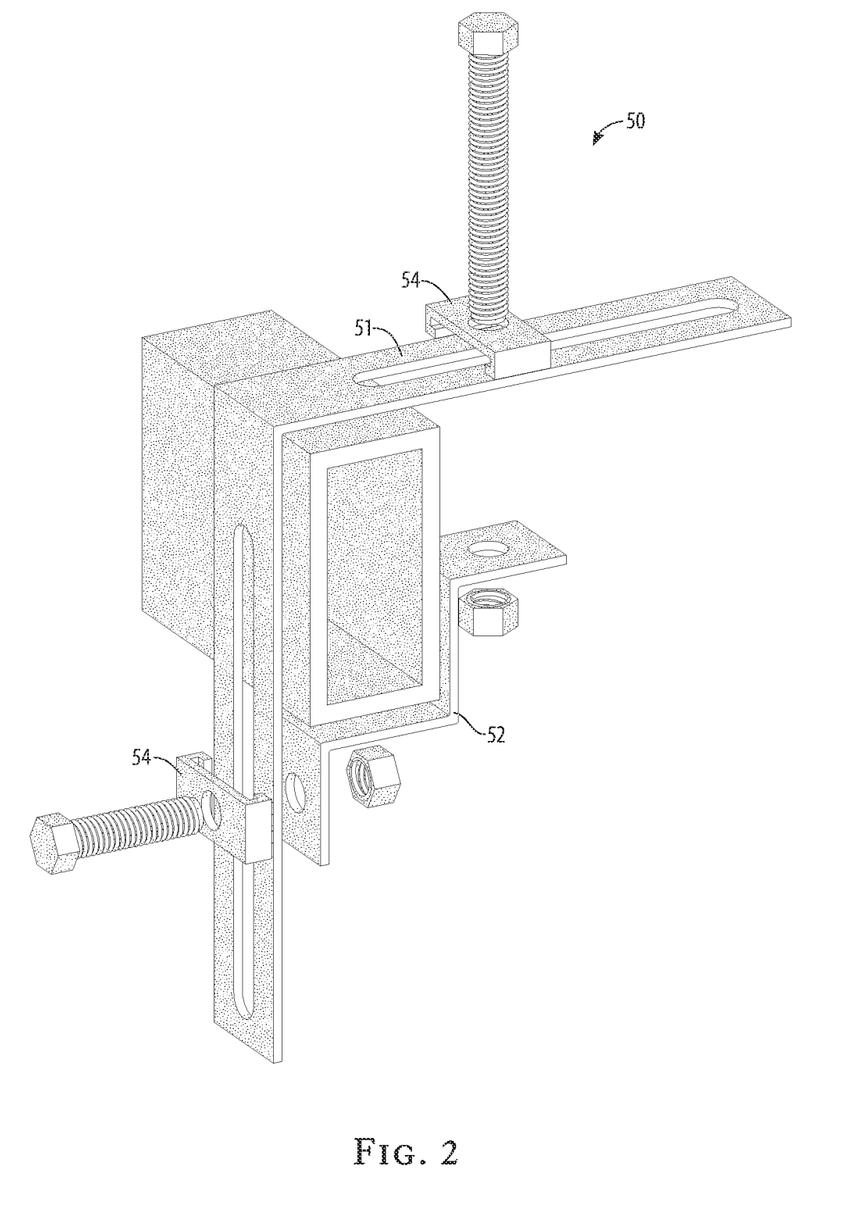
FIG. 2 is an exploded view of an embodiment of the universal mounting clamps system and method of the invention in use on a vertical rectangular profile.

Referring to FIG. 1, an embodiment of a mounting-clamp unit 50 of the universal mounting clamps system and method is shown in use, mounting an accessory to a structure having a rectangular profile. Referring additionally to FIG. 2, the mounting-clamp unit 50 provides an angled accessory-mount bracket 51 which has legs at a right angle. The legs each provide a long slot running from the ends of each leg and extending along most of the length of the legs. The angled accessory-mount bracket 51 is placed over a corner of a structure having an angled profile. A clamping bracket 52 is provided, which also has a right angle. The clamping bracket 52 is placed over the diagonally opposite corner of the structure, and is fastened to the angled accessory-mount bracket 51 using fasteners, such as the bolts and nuts illustrated, as known in the art. Fastener positioners 54 are provided to position the fasteners and to increase the effective mounting area and improve the performance of the fasteners.

Figure 3:
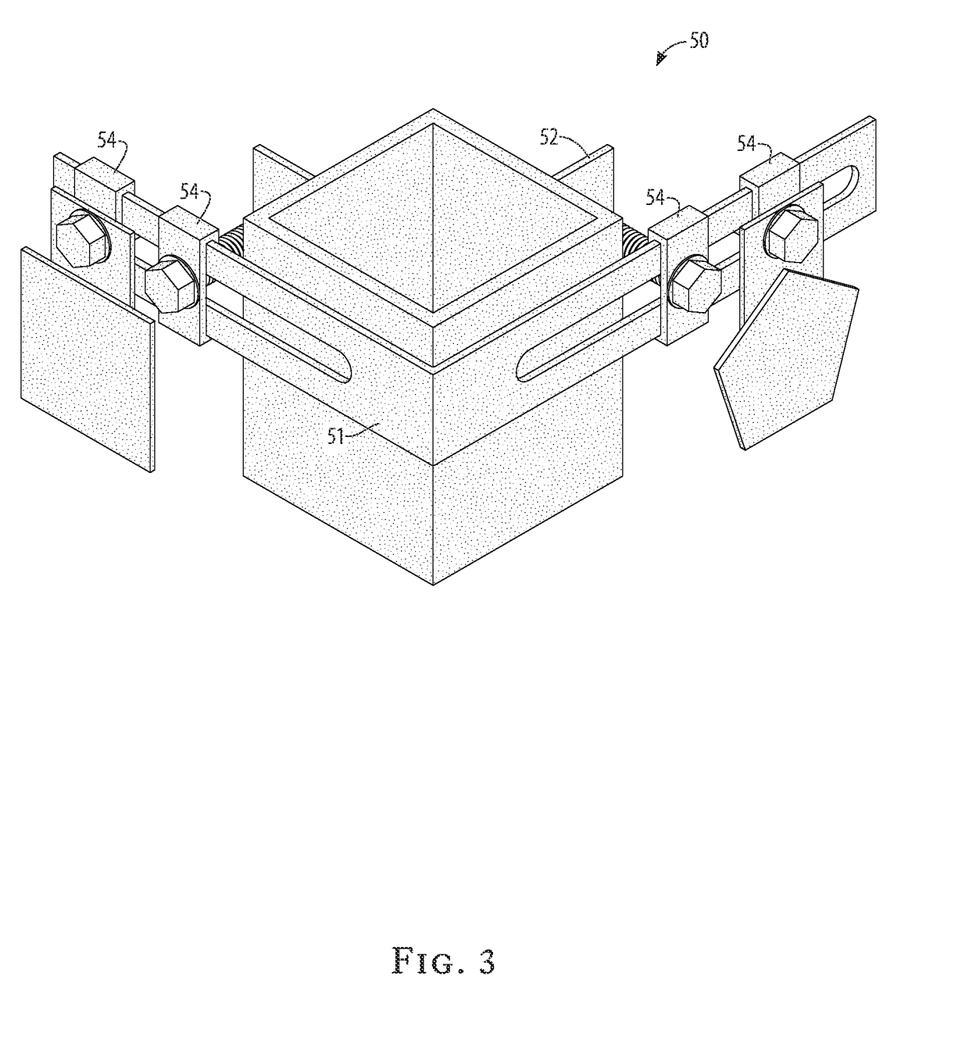
FIG. 3 is a perspective view of the universal mounting clamps system and method of the invention in use mounting accessories on a vertical post having a square profile.

Referring additionally to FIG. 3, the mounting-clamp units, in the embodiments treated here, provide an ability to be mounted to a wide range of sizes and profile shapes of structures, and also provide area for the mounting of accessories such as lights, reflectors, signs, controllers, sockets, cameras, and sensors, mounted through the slotted area of the accessory-mount brackets not used for fastening.

Figure 4:
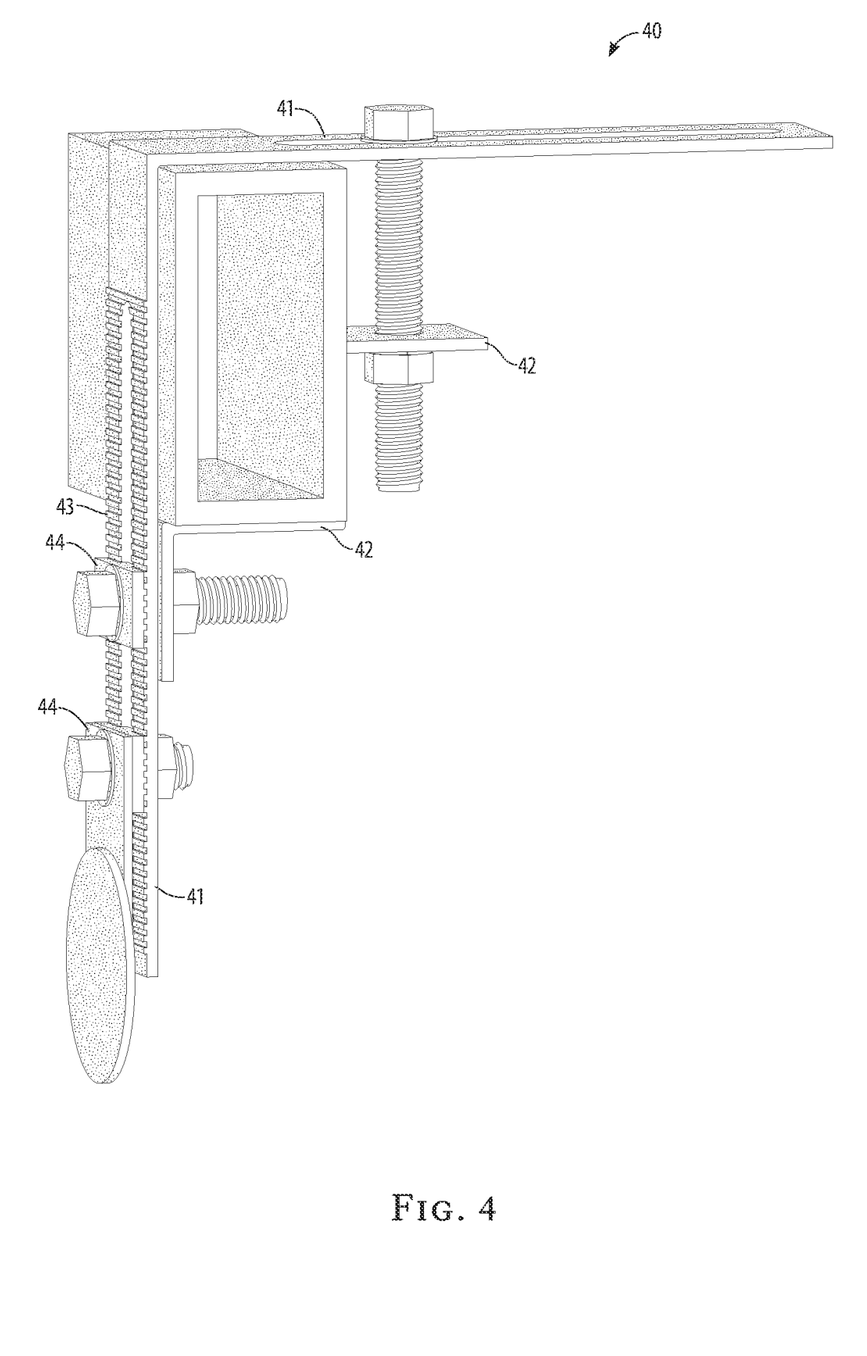
FIG. 4 is a perspective view of a toothed embodiment of the universal mounting clamps system and method of the invention in use mounting an accessory.
Figure 5:
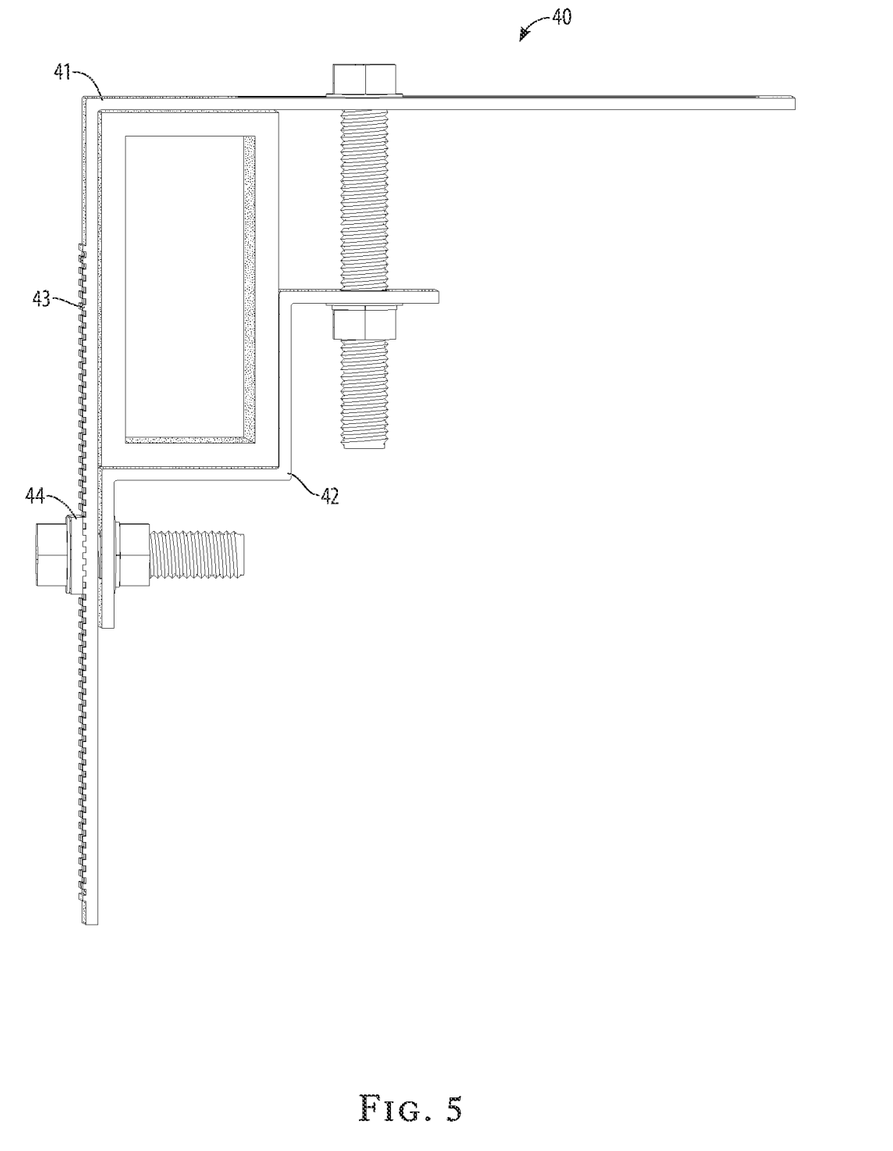
FIG. 5 is a side view of a toothed embodiment of the universal mounting clamps system and method of the invention assembled.
Figure 6:
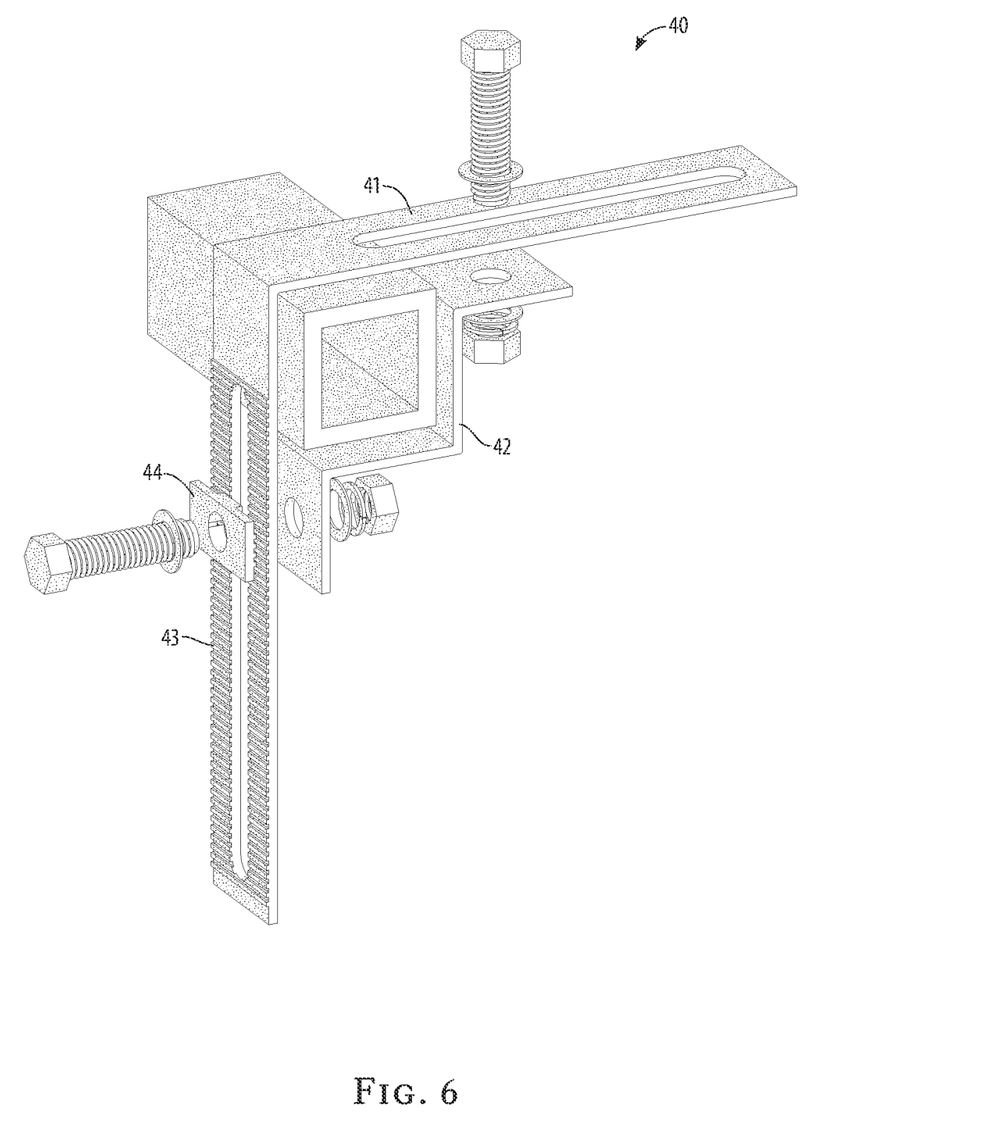
FIG. 6 is an exploded view of a toothed embodiment of the universal mounting clamps system and method of the invention in use on a small square profile.
Figure 7:
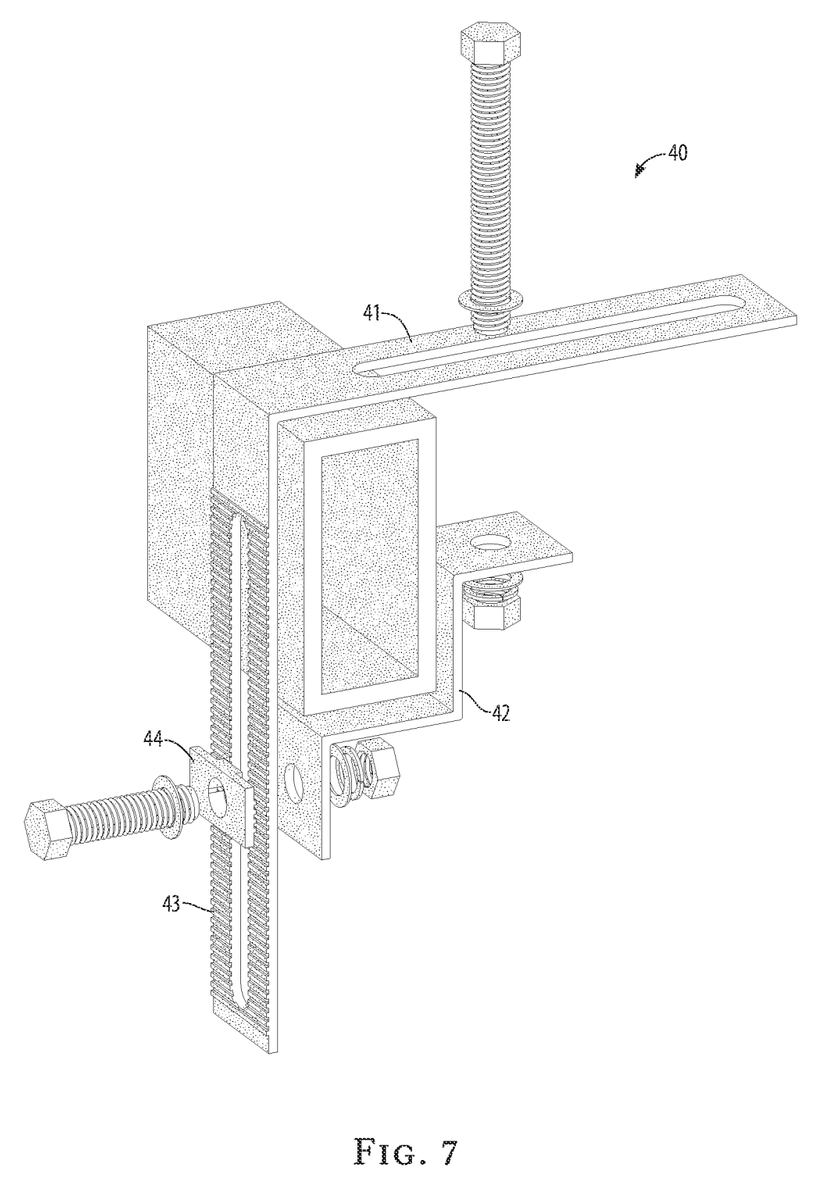
FIG. 7 is an exploded view of a toothed embodiment of the universal mounting clamps system and method of the invention in use on a vertical rectangular profile.
Figure 8:
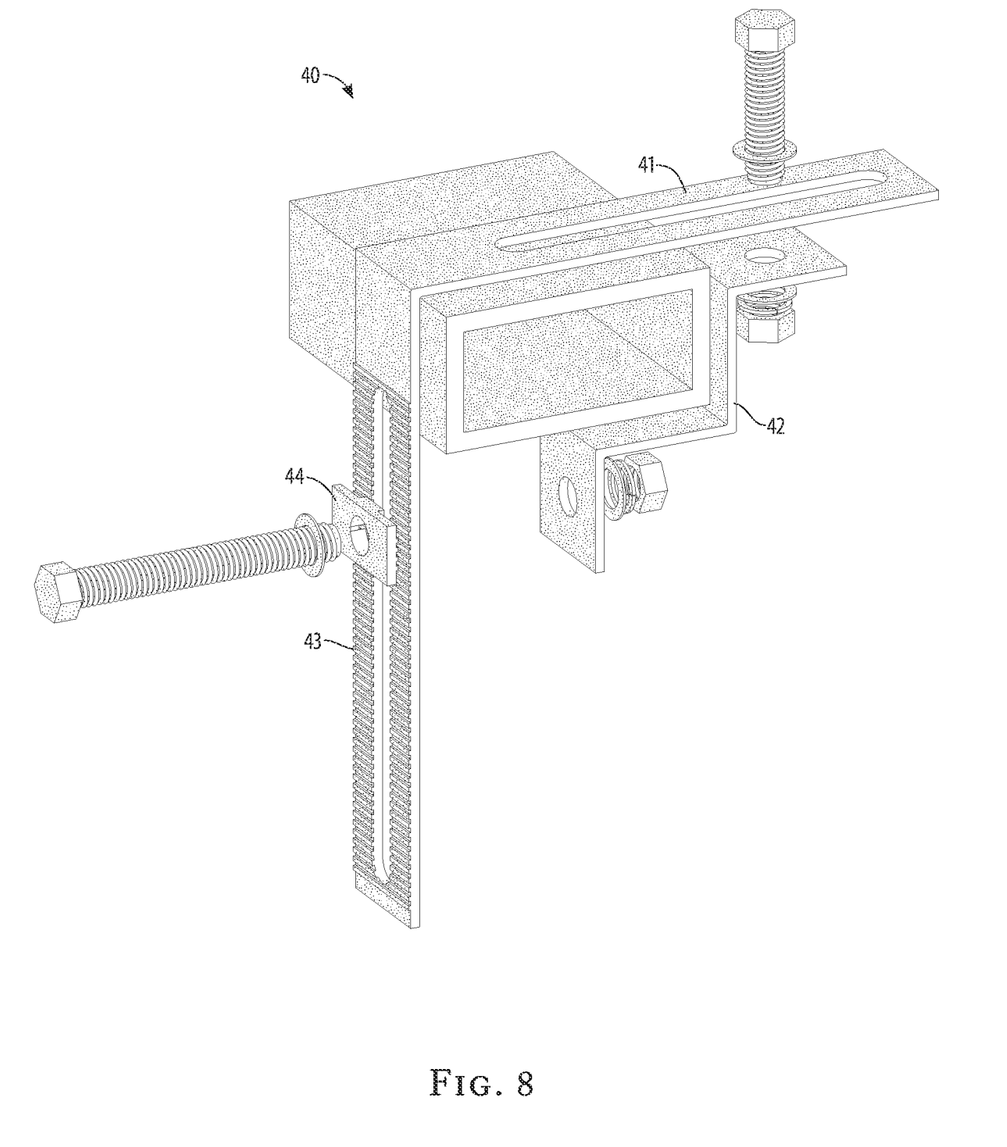
FIG. 8 is an exploded view of a toothed embodiment of the universal mounting clamps system and method of the invention in use on a horizontal rectangular profile.
Figure 9:
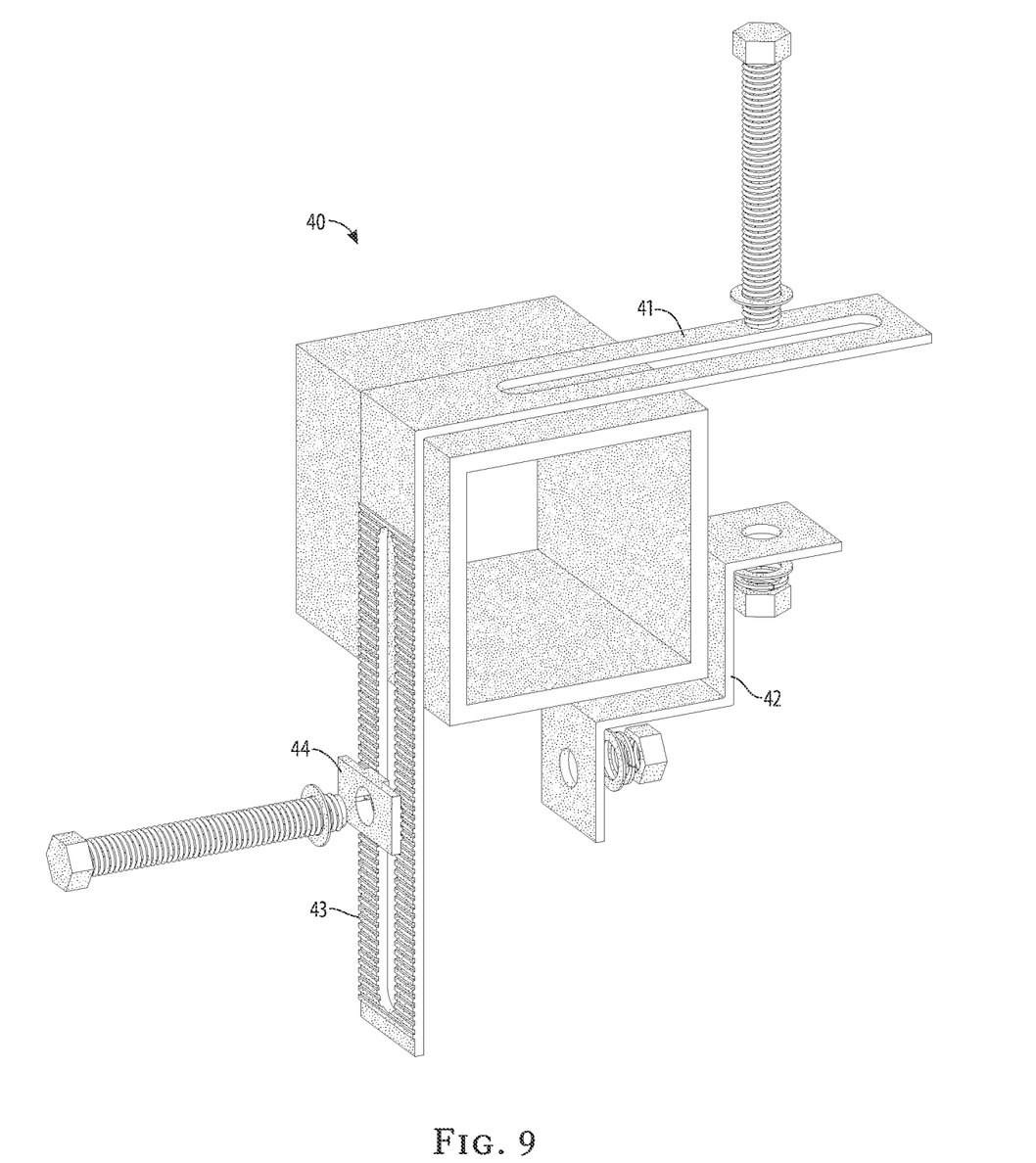
FIG. 9 is an exploded view of a toothed embodiment of the universal mounting clamps system and method of the invention in use on a large square profile.

Referring to FIG. 4, a toothed embodiment providing a toothed angled mounting-clamp unit 40 is shown in use, mounting an accessory to a structure having a rectangular profile. Referring additionally to FIG. 5, the toothed mounting-clamp unit 40 provides a toothed angled accessory-mount bracket 41 which has legs at a right angle. One or both of the legs of the toothed angled accessory-mount bracket 41 provide teeth 43 which improve positioning and fixing in place when used with toothed fastener positioners 44 having corresponding teeth. The legs each provide a long slot running from the ends of each leg and extending along most of the length of the legs. The toothed angled accessory-mount bracket 41 is placed over a corner of a structure having an angled profile. A clamping bracket 42 is provided, which also has a right angle. The clamping bracket 42 is placed over the diagonally opposite corner of the structure, and is fastened to the toothed angled accessory-mount bracket 41 using fasteners, such as the bolts and nuts illustrated, as known in the art.

Referring to FIGS. 6-9, the angled mounting-clamp unit 50 and toothed angled mounting-clamp unit 40 can be used with a variety of sizes and angled-profile shapes of structures.

Figure 10:
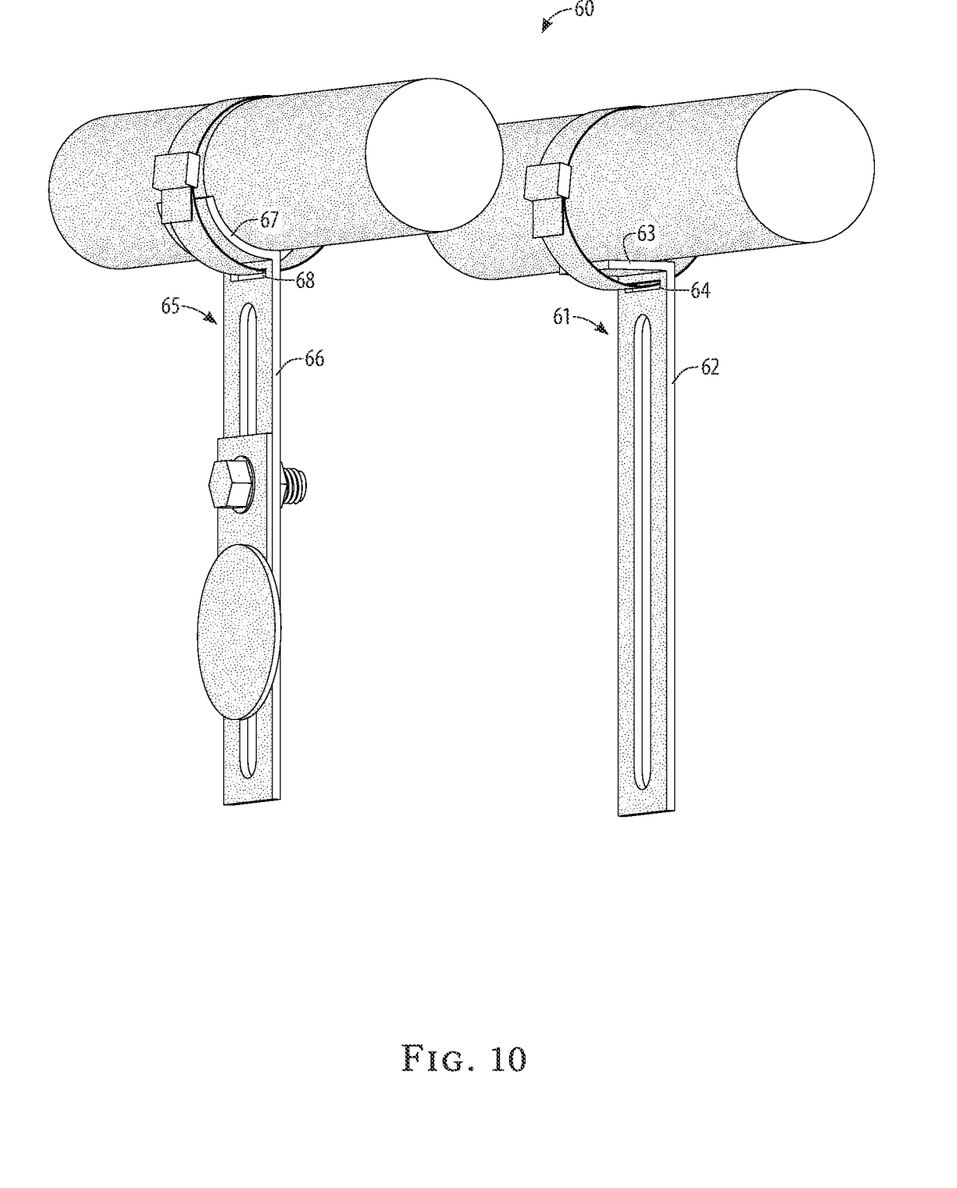
FIG. 10 is a perspective view of two round-structure embodiments of the mounting-clamp unit of the universal mounting clamps system and method of the invention in use.

Referring to FIG. 10, a rounded-structure embodiment appropriate for use on round, oval, or curved-profile structures provides a curved mounting-clamp unit 60, which in turn is provided in two embodiments, a flat-positioner embodiment 61 and a curved-positioner embodiment 65. Both embodiments provide an accessory-mount leg 62, 66 which provides a long slot and area for mounting of accessories, as treated above. Both embodiments provide a positioning leg at an angle to the accessory-mount leg and meant to be mounted against and in contact with the structure, keeping the accessory-mount leg at the desired position and angle relative to the structure. The flat-positioner embodiment 61 provides a flat positioning leg 63. The curved-positioner embodiment 65 provides a curved positioning leg 67. Both embodiments provide a fastener slot 64, 68 near the angled join between the accessory-mount leg and the positioning leg. The curved mounting-clamp unit 60 is mounted upon the structure using one or more fasteners known in the art, such as hose clamps or zip ties. The positioning leg 63, 67 is mounted tightly to the rounded structure and holds the accessory-mount leg 62, 66 at the desired position and angle.

Many other changes and modifications can be made in the system and method of the present invention without departing from the spirit thereof. I therefore pray that my rights to the present invention be limited only by the scope of the appended claims.

I claim:

1. A universal mounting clamps system for mounting of accessories to a structure, using fasteners, the universal mounting clamps system comprising:
   (i) at least one angled mounting-clamp unit, comprising:
      (a) an angled accessory-mount bracket having a first leg extending at a right angle to a second leg, adapted to provide area for mounting accessories;
      (b) a clamping bracket four straight sections extending at right angles to one another in a zigzag pattern, adapted for mounting to said angled accessory-mount bracket using fasteners; and
      (c) at least one fastener positioner adapted to position fasteners on said angled accessory-mount bracket; and
   (ii) at least one curved mounting-clamp unit, comprising:
      (a) an accessory-mount leg adapted to provide area for mounting accessories;
      (b) a positioning leg at an angle to said accessary-mount leg, adapted to being held to the structure by a fastener; and
      (c) a fastener slot between said accessory-mount leg and said positioning leg.

2. The universal mounting clamps system of claim 1, where said mounting-clamp units are made of steel.

3. The universal mounting clamps system of claim 1, where said mounting-clamp units are protected with paint.

4. The universal mounting clamps system of claim 1, where said mounting-clamp units are protected with epoxy.

5. The universal mounting clamps system of claim 1, where said mounting-clamp units are protected with bonded powder coating.

6. The universal mounting clamps system of claim 1, where said mounting-clamp units are protected with rubberized coating.

7. The universal mounting clamps system of claim 1, where said angled accessory-mount bracket has teeth.

8. The universal mounting clamps system of claim 1, where said at least one fastener positioner has teeth.

9. The universal mounting clamps system of claim 1, where said positioning leg is flat.

10. The universal mounting clamps system of claim 1, where said positioning leg is curved.

11. A universal mounting clamps method of mounting of accessories to a tow-bar structure, the universal mounting clamps method comprising:
   (i) providing a universal mounting clamps system comprising:
      (a) at least one angled mounting-clamp unit, comprising:
         (1) an angled accessory-mount bracket having a right angle, adapted to provide area for mounting accessories;
         (2) a clamping bracket having a right angle, adapted for mounting to said angled accessory-mount bracket using fasteners; and
         (3) at least one fastener positioner adapted to position fasteners on said angled accessory-mount bracket;
      (b) at least one curved mounting-clamp unit, comprising:
         (1) an accessory-mount leg adapted to provide area for mounting accessories;
         (2) a positioning leg at an angle to said accessary-mount leg, adapted to being held to the structure by a fastener; and
         (3) a fastener slot between said accessory-mount leg and said positioning leg;
   (ii) mounting at least one mounting-clamp unit from said universal mounting clamps system upon the structure; and
   (iii) attaching at least one accessory upon said at least one mounting-clamp unit.

12. The universal mounting clamps method of claim 11, where said mounting-clamp units are made of steel.

13. The universal mounting clamps method of claim 11, where said mounting-clamp units are protected with paint.

14. The universal mounting clamps method of claim 11, where said mounting-clamp units are protected with epoxy.

15. The universal mounting clamps method of claim 11, where said mounting-clamp units are protected with bonded powder coating.

16. The universal mounting clamps method of claim 11, where said mounting-clamp units are protected with rubberized coating.

17. The universal mounting clamps method of claim 11, where said angled accessory-mount bracket has teeth.

18. The universal mounting clamps method of claim 11, where said at least one fastener positioner has teeth.

19. The universal mounting clamps method of claim 11, where said positioning leg is flat.

20. The universal mounting clamps method of claim 11, where said positioning leg is curved.

* * * * *